United States Patent
Wright

(10) Patent No.: US 7,789,758 B2
(45) Date of Patent: Sep. 7, 2010

(54) VIDEO GAME WITH SIMULATED EVOLUTION

(75) Inventor: Will Wright, Orinda, CA (US)

(73) Assignee: Electronic Arts, Inc., Redwood City, CA (US)

( * ) Notice: Subject to any disclaimer, the term of this patent is extended or adjusted under 35 U.S.C. 154(b) by 596 days.

(21) Appl. No.: 11/684,489

(22) Filed: Mar. 9, 2007

(65) Prior Publication Data

US 2007/0238499 A1    Oct. 11, 2007

Related U.S. Application Data

(60) Provisional application No. 60/781,251, filed on Mar. 10, 2006.

(51) Int. Cl.
    *A63F 9/24*    (2006.01)
(52) U.S. Cl. ............................................. 463/42; 463/1
(58) Field of Classification Search ....................... None
    See application file for complete search history.

(56) References Cited

U.S. PATENT DOCUMENTS

| | | | | | |
|---|---|---|---|---|---|
| 5,618,043 | A | * | 4/1997 | McGlew | 273/308 |
| 6,119,229 | A | * | 9/2000 | Martinez et al. | 726/28 |
| 6,171,189 | B1 | * | 1/2001 | Katano et al. | 463/43 |
| 6,200,216 | B1 | * | 3/2001 | Peppel | 463/1 |
| 6,941,353 | B1 | * | 9/2005 | Lane | 709/219 |
| 7,179,171 | B2 | * | 2/2007 | Forlines et al. | 463/41 |
| 7,214,133 | B2 | * | 5/2007 | Jen et al. | 463/42 |
| 2005/0021398 | A1 | * | 1/2005 | McCleskey et al. | 705/14 |
| 2005/0026685 | A1 | * | 2/2005 | Ruark et al. | 463/31 |

OTHER PUBLICATIONS

Doomworld: Editors & Utilities, website containing player created content of editors and utilities to manipulate or create maps for Doom, Doom2, Heretic, Hexen or Strife, 12 pages.*
SimLife: The Genetic Playground Computer game by Maxis, released in 1992, as reported by Wikipedia.com, 4 pages.*
Creatures Game Manual, copyright 1996, 23 pages.*
Creatures (artificial life program) developed by Millenium, released by Mindscape in 1996 as reported by Wikipedia.com, 22 pages.*
Rowena's Incubator, The Original Creatures Webring site by Rowena having user created content available for download, created Jun. 22, 1997 and updated Jun. 13, 1998, 6 pages.*

(Continued)

*Primary Examiner*—M. Sager
(74) *Attorney, Agent, or Firm*—Philip H. Albert; Townsend and Townsend and Crew, LLP

(57) ABSTRACT

A video game that provides a player game play experience that simulates an evolution process is disclosed. In each stage of the evolution process, the player can create game content that is uploaded to a server. Other players' game content can also be downloaded into the player's game. In an embodiment of the present invention, the player-defined content can be automatically uploaded to a server, where it can be automatically downloaded to players' games in accordance with criteria such as heuristics that are relevant to the game, player preferences, rankings, community preferences and combinations thereof.

20 Claims, 15 Drawing Sheets

OTHER PUBLICATIONS

SimLife description and review by P. Riddell, 8 pages.*

Civilization (video game) by Sid Meier released by MicroProse in 1991 as reported by Wikipedia.com, 14 pages.*

Spore (2008 video game) developed by Maxis, designed by Will Wright and released by Electronic Arts in Sep. 2008 as reported by Wikipedia.com, 43 pages.*

The Sims vide game created by Will Wright, developed by Maxis and published by Electronic Arts in Feb. 2000 as reported by Wikipedia.com, 23 pages.*

The Sims Online, published by Electronic Arts as reported by Wikipedia.com, 8 pages.*

PC Novice Learning Series: Internet Basics, by Sandhills Publishing Company, copyright 1999, 61 pages.*

* cited by examiner

701 Three-legged Creature
Fig 7A
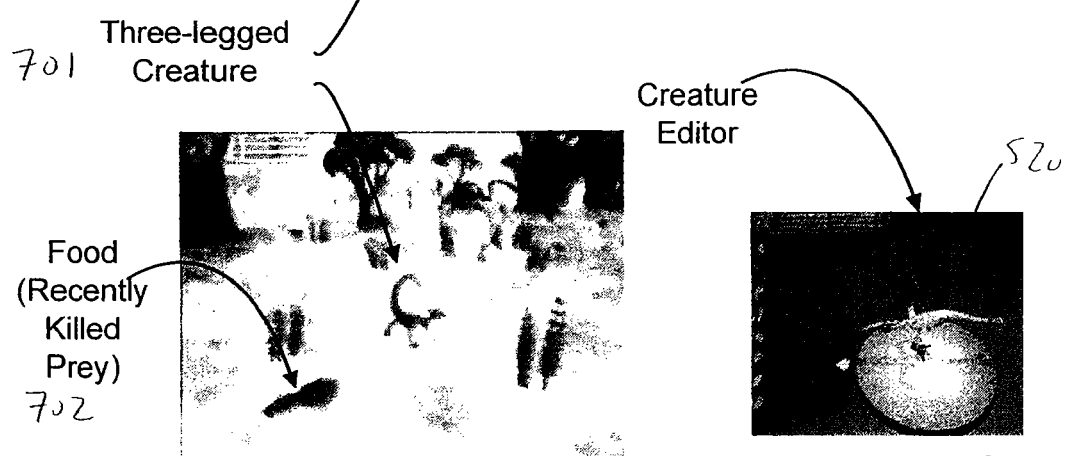
Food (Recently Killed Prey) 702
Creature Editor 520
Fig 7B
Fig 7C
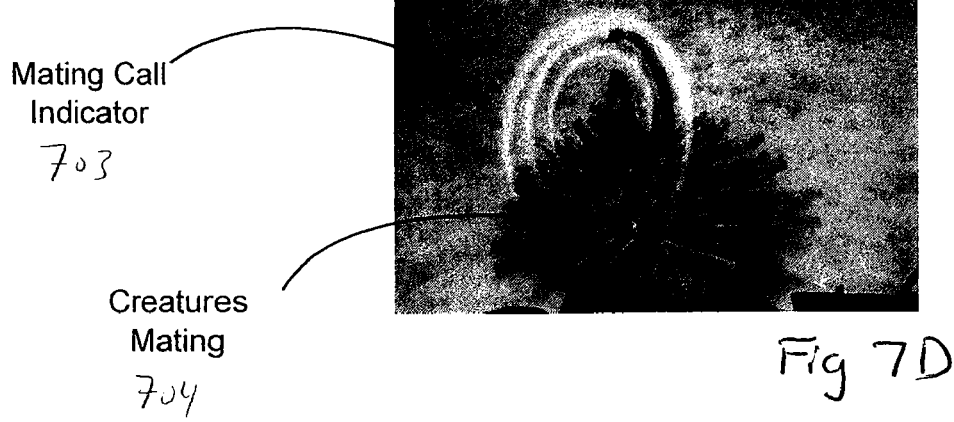
Mating Call Indicator 703
Creatures Mating 704
Fig 7D Building Editor
901

Drop edited building into city
902

City with different style characteristics and aesthetics from city above

City (View from Planet) 1002

Vehicles 1001

City (View from Space)

Creatures

Vehicles

VIDEO GAME WITH SIMULATED EVOLUTION

CROSS-REFERENCES TO RELATED APPLICATIONS

This application is a claims the benefit of U.S. Provisional No. 60/781,251, filed on Mar. 10, 2006, the full disclosure of which is incorporated herein by reference.

BACKGROUND OF THE INVENTION

The present invention relates generally to video games and in particular to video games that simulate evolution and allow multiple persons to share player-defined content via a network.

Video games provide entertainment for a growing community of players. What makes a game entertaining typically depends on the preferences of the individual player. There are a number of different game genres, with each genre appealing to some players and not others. Examples of game genres include real-time strategy (RTS), first-person shooter games (FPS), and role-playing games (RPG). Players who prefer to play with and against many other players are typically drawn to massively multiplayer online games (MMOG).

MMOGs typically contain one virtual world in which all of the players participate. One problem with MMOGs is that a large amount of data is involved in keeping the virtual worlds up-to-date with all of the player transactions and their effects on the virtual world. This requires a large investment in computer resources such as storage space and server connections. For example, a MMOG may need to provide each player with a simultaneous connection to the server. As the number of players grows, so does the load on the server. Similarly, as the players add things such as enhanced abilities and/or items to their characters and to their worlds, the amount of storage space required to track all of the changes increases over time, and eventually becomes prohibitively expensive.

Some players prefer to play on their own computer or game console rather than compete against other people. Simulated life games provide a game experience where the player can develop a virtual world in which his or her characters can live and work. The Sims™ video game is an example of such a game. In The Sims™ video game players spend countless hours developing characters, buildings, lots and stories for their game. An entire community has been built up around the game. Dedicated fan web sites provide a forum for sharing game content. A player can develop a character and manually upload it to a web site so that other players can see it and download it into their own games. Some players even specialize in creating specific kinds of content. For example, a player might be known for creating certain kinds of houses. Player-defined content such as this makes the game more interesting, but it can be somewhat inconvenient for a player to incorporate this player-defined content into his or her game. The player must first find suitable player-defined content, which requires the player to stop playing the game to search and download content, such as by browsing web servers or other servers for content. Furthermore, once the player finds the content, the content must be downloaded and manually integrated into the player's game. This process can be both time consuming and inconvenient. Thus, what is required is a video game that enhances the player experience with interesting game play by providing an enhanced player community experience by providing a convenient system and method to allow players to create and share game content with other players.

BRIEF SUMMARY OF THE INVENTION

A video game system according to embodiments of the present invention provide for a networked evolution game that allows multiple players to share player-defined game content over a network.

In some embodiments, a game client simulates a plurality of bands of evolution of video game characters, where the game play and the user interface change for different bands of evolution. In some embodiments, the interface provided for game play is two-dimensional for some bands of evolution and three-dimensional for other bands of evolution. In some embodiments, players play by themselves.

In a system for playing a video game according to aspects of the present invention, a game content editing module is provided for creating player-defined game content. The player-defined game content includes an identification tag that associates the player-defined game content with the player. The system also includes an upload module for uploading the player-defined content to a game server. Furthermore, the system includes a download module for downloading a local copy of game content from the game server. Both player-defined game content and publisher-defined game content may be downloaded from the game server according to some embodiments. In some embodiments, the handling (finding, obtaining, using, etc.) of such content is integrated within the game.

A video game server might include logic to couple the game server to a plurality of game clients via a network, a data repository, an upload module, a content matching module, and a download module. The data repository can be adapted for storing game content. The upload module can be adapted for uploading player-defined content from the plurality of game clients into the game repository. The content matching module can be adapted to select game content from the data repository for download to the plurality of client device. The download module can be adapted for downloading game content from the data repository to the plurality of client devices in accordance with the content matching module.

Other features and advantages of the invention will be apparent in view of the following detailed description and preferred embodiments.

BRIEF DESCRIPTION OF THE DRAWINGS

FIG. 7A is a diagram illustrating examples of game content as shown in the content editor user interface and as shown in the context of game play in the creature game.

FIG. 7B is another diagram illustrating examples of game content as shown in the content editor user interface and as shown in the context of game play in the creature game.

FIG. 7C is yet another diagram illustrating examples of game content as shown in the content editor user interface and as shown in the context of game play in the creature game.

FIG. 7D is a diagram illustrating examples of game content as shown in the context of game play in the creature game.

DETAILED DESCRIPTION OF THE INVENTION

Figure 1:
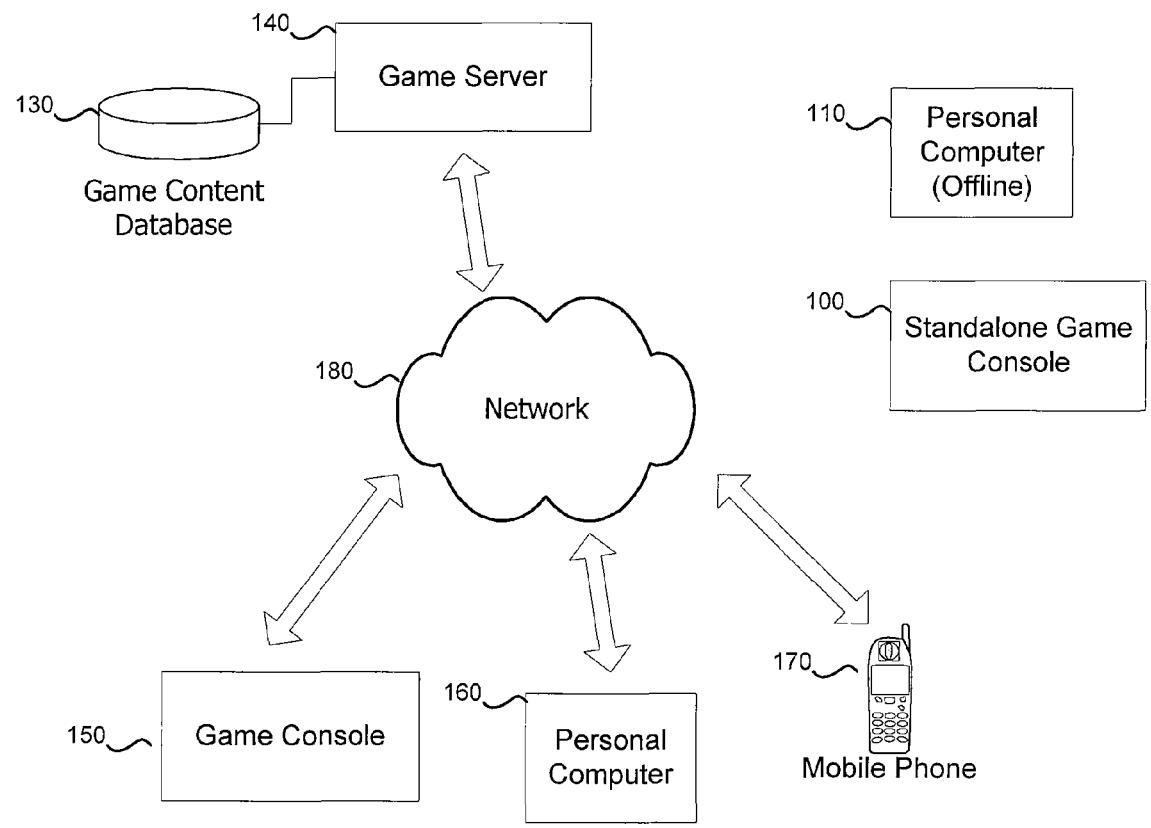
FIG. 1 is a diagram illustrating a video game environment in accordance with an embodiment of the present invention.

Successful video games enhance the player experience with interesting game play and challenges. When the game play leads to the creation of a player community around the game, the experience is further enhanced by the players' interaction with the community. In accordance with embodiments of the present invention, a video game with simulated evolution is provided that enhances the player's game play experience. The player's experience is further enhanced by enabling the players to create their own game content and to share that player-defined content conveniently with other players. In some embodiments, the player-defined content can be automatically uploaded to a server, where it can be automatically downloaded to players' game clients in accordance with criteria such as heuristics that are relevant to the game, player preferences, rankings, community preferences and combinations thereof. In other embodiments, player-defined content is not automatically downloaded to the players' game client.

Embodiments of the video game with simulated evolution are divided into various levels simulating "bands" or phases of biological and/or social evolution. Biological evolution is a natural process through which creatures experience changes from one generation to the next though subtle (or in some cases, not so subtle) genetic mutations. Over time, these mutations may accumulate and new traits may emerge, such as changes to coloration, body shape and/or increased intelligence. At least some of these new traits might provide a survival advantage, and these traits might be passed down to subsequent generations. Traits that do not provide such a survival advantage might not be passed on to subsequent generations, because, for example, the creatures carrying these less successful traits might not survive long enough to reproduce in sufficient numbers to maintain these traits in the population. Biological evolution might be simulated in some embodiments by editing one or more a creature's attributes. In some embodiments, an editor might be provided that enables a player to edit a creature's attributes. In other embodiments, a "mutation" algorithm may be included to cause randomized changes to a creature's attributes over time. In yet other embodiments, biological evolution may be simulated by "mating" two creatures with differing attributes to produce an offspring that has a set of attributes that combines attributes of the parent creatures.

In addition to biological evolution, the game may also simulate social evolution of creatures. For example, the creatures might learn to work with one another to built increasingly complex webs of social interactions. For example, a particular species of creature may evolve from an independent creature phase of evolution, where the focus is the survival of a single creature, to a tribal phase of evolution where groups of the creatures band together for their mutual benefit. As this social evolution continues, the creatures might continue to build more and more complex social relationships. For example, over time, the creatures may develop cities and/or civilizations.

The game might be divided into multiple levels representing various bands or phases of evolution with each band of evolution characterized by a particular stage of biological and/or social evolution. For example, the game may include a cellular band of evolution where the focus of the game play is the development of a single-celled organism, while another band of the game might focus on the development of an individual multi-cellular creature. Other bands of evolution might be characterized by various stages of social evolution. For example, one band of evolution represented in the game may be a tribal phase of evolution where a plurality of creatures interact for the benefit of the tribe, while another band of evolution may comprise a civilization phase of evolution where multiple tribes and/or cities and/or countries interact with one another. Some bands of evolution might focus solely on either biological or social evolution, while other bands might focus both on biological and social evolution.

FIG. 1 is a diagram illustrating a video game environment in accordance with an embodiment of the present invention. In contrast to MMOGs, a video game for simulated evolution in accordance with an embodiment of the present invention runs asynchronously. The game provided by the game system is not an interactive game between a players connected to a game server 140 via a plurality of game clients. Instead, players maintain a copy of player-defined and publisher-defined game content on their game client and changes that the player makes to the local copies of the player-defined and publisher-defined content are not reflected in the content stored in a game content database 130. For example, if a player blows up a world in his or her local copy of the game, the game data representing that world will not be updated in game content database 130. Thus, players cannot lose their game content to other players.

As described above, the game described herein provides advantages over typical MMOGs. In a typical MMOG, a plurality of players participates in a single massive game environment, and a plurality of players may be altering the state of the game environment simultaneously. The MMOG game server must not only keep track of these changes, but it must also notify each of the plurality of players of changes to the environment so that the players have an updated and accurate view of the current state of the game world. As a result, an MMOG game may place significant demands for memory, processing power, and data storage on an MMOG game server.

In contrast to MMOGs, the game described herein may significantly reduce the processing burden placed on the game server by offloading much of the processing to the players' game clients, because each player plays a separate instance of the game on his or her game client. Each player interacts with their own simulated world maintained on their game client, unlike an MMOG where a plurality of players interacts with a massive shared virtual world. As a result, the game server does not have to maintain game state information for a plurality of players and objects within an active game. A player's game clients need only include sufficient memory to store the game data for the player's game data and enough processing power to process change to the game state as a result of the player's interaction with the game.

Another advantage over typical MMOG is that the amount of data storage required on the game server might also be significantly reduced. As described above, the game data to maintain each player's game environment is maintained on the player's game client. Thus, the amount of data storage required on the game server might be significantly reduced. In some embodiments, players are able to share player-defined content by uploading the content to the game server. However, this content might be compressed to further reduce the amount of data storage required to house this data.

Another advantage provided by each player interacting with a separate instance of the game is that each player may experience an individualized and unique game play experience, unlike an MMOG where all of the players interact with the same virtual world. In some embodiments, players may elect which player-defined creatures and/or objects to download to the game client. Therefore, the player is able to develop his or her own customized and individualized game experience to suit the player's preferences.

Game server 140 is connected to network 180. In a preferred embodiment, network 180 is the Internet, but other networks could work as well. Game server 140 can access game content from game content database 130. In some embodiments, game content database 130 is located on game server 140. In other embodiments, game content database 130 is located on a separate server, such as a database management system server that is connected to game server 140 via network or other data connection. Game server 140 may store both player-defined content and publisher-defined game content in game content database 130. Game server 140 is adapted to receive requests from the plurality of client devices to upload player-defined content and to process requests from the plurality of client devices to download both player-defined and publisher-defined content from game content database 130 to the plurality of client devices.

Game server 140 is can be accessed by a plurality of client devices via network 180. The plurality of client devices may comprise a variety of different video game platforms, such as video game consoles, personal computers, and/or mobile phones and/or other mobile electronic devices that include network connectivity. In the example shown, game server 140 is connectable to a game console 150, a client computer 160, and a mobile phone 170.

The video game system for playing a video game with simulated evolution illustrated in FIG. 1 provides for playing the video game in both a standalone mode and a networked mode. Players can create player-defined content in both modes. Content creation is described in more detail below. In standalone mode, players are not able to share player-defined content with other players by uploading content to game server 140 nor are players able to download player-defined content created by other players.

As described above, the video game system illustrated in FIG. 1 supports game play in a standalone mode on game platforms that are not connected to network 180 or only have intermittent network connections. For example, a standalone game console 100 can be used to play a local copy of the game. A player can play the game with a local copy of publisher-defined content provided with the game and can create player-defined content. However, the player will not be able to upload player-defined content to game server 140 and will not be able to download player-defined content from game server 140 that has been uploaded by other players.

The video game system illustrated in FIG. 1 also supports game play on game clients with intermittent network connectivity, such as personal computer 110. Players may upload player-defined content and/or download player-defined and publisher-defined content while the game client with intermittent network connectivity is connected to network 180 and play the game as a standalone system while the game client is disconnected from network 180. Accordingly, players with intermittent connectivity may advantageously share player-defined content by uploading content to the server and/or downloading player-defined content from other players while network connectivity is available. Another advantage of the present embodiment is that players can continue playing the game during periods where network connectivity is unavailable, unlike MMOGs which require network connectivity to the game server to play the game.

Figure 2:
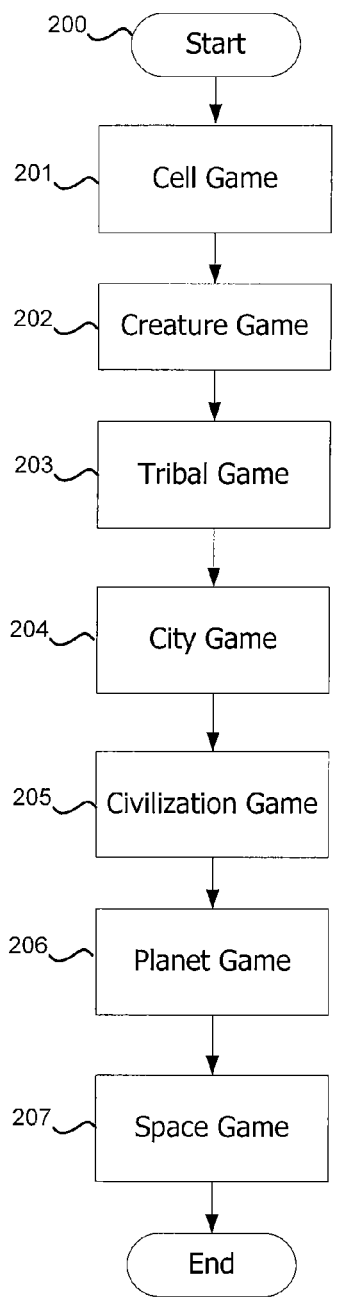
FIG. 2 is a diagram illustrating a flow of a video game with simulated evolution in accordance with an embodiment of the present invention.

FIG. 2 is a diagram 200 illustrating the flow of a video game with simulated evolution according to an embodiment of the present invention. The video game includes a plurality of game levels including levels for a cell game 201, a creature game 202, a tribal game 203, a city game 204, a civilization game 205, a planet game 206 and a space game 207. Each game level is focused on a particular stage of evolution and each stage of evolution provides a set of unique challenges that a player and the player's characters must overcome in order to proceed to the next stage of evolution. The general flow of the game follows the evolution of a player's characters from tiny, single-celled creatures in a primordial soup, up through space exploration. A player follows the evolutionary path through the various game levels as his or her character grows from a single-celled microorganism to a creature, to groups of creatures, and eventually to civilizations, worlds, planets and solar systems. The various evolutionary levels of the game are described in greater detail below. Each level of the game presents unique challenges and integrates one or more of the various game genres described above. In this manner, a player is provided with a game "series" wherein each level plays differently and to get to a particular level, the player has to play such that the player's character(s) survives long enough to "evolve" to the next stage of being.

Typically a player will play one level at a time. The player may progress from a current level to the next by fulfilling a number of motives for the current level. Once the player has fulfilled a predetermined threshold of motives, the player may proceed to next level of the game. As players progress from one game level to the next, they are presented with a set of unique challenges as the players' characters evolve and the game genre changes from level to level.

Figure 3:
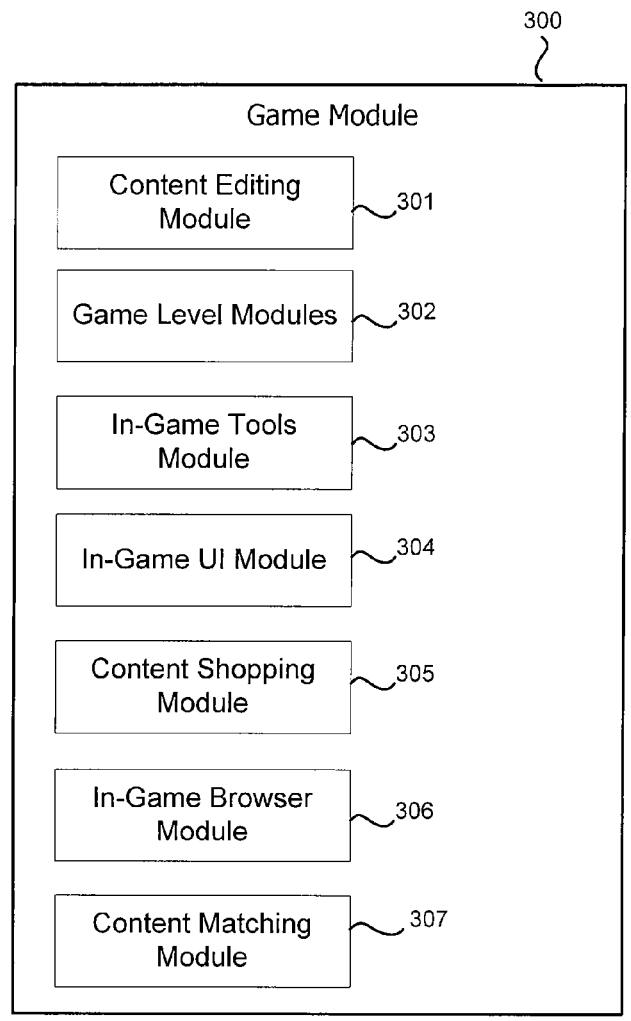
FIG. 3 is a block diagram illustrating a video game module in accordance with an embodiment of the present invention.

FIG. 3 is a block diagram illustrating a video game module 300 comprising a set of computer program instructions stored on a storage media on a client device that are executed by the client device in order to operate the game. For example, game module may be stored in a persistent memory coupled to the client device such as a hard disk drive, a flash memory, and/or an optical media. Game module 300 may be also stored on a removable medium such as an optical disk (such as a DVD or CD-ROM), a flash drive, and/or a game cartridge.

Game module 300 includes a content editing module 301, a plurality of game level modules 302, a plurality of in-game tools modules 303, an in-game user interface (UI) module 304, a content shopping module 305, and a content matching module 307. In some embodiments, the game module may also include an in-game browser 306 that can be used to browse for additional content that may be loaded into the game. In-game browser 306 might operate similarly to the in-game browser included The Sims™ video game. In some embodiments, the in-game browser may be used in conjunction with a mobile phone so that a player can browse for content by connecting to the server via his or her or her mobile phone, flagging any content that he or she deems to be interesting enough to download from the server, and downloading the content later. In alternative embodiments, the server automatically downloads the selected content so that it is ready for the player when he or she gets back to his or her usual game system.

Figure 4:
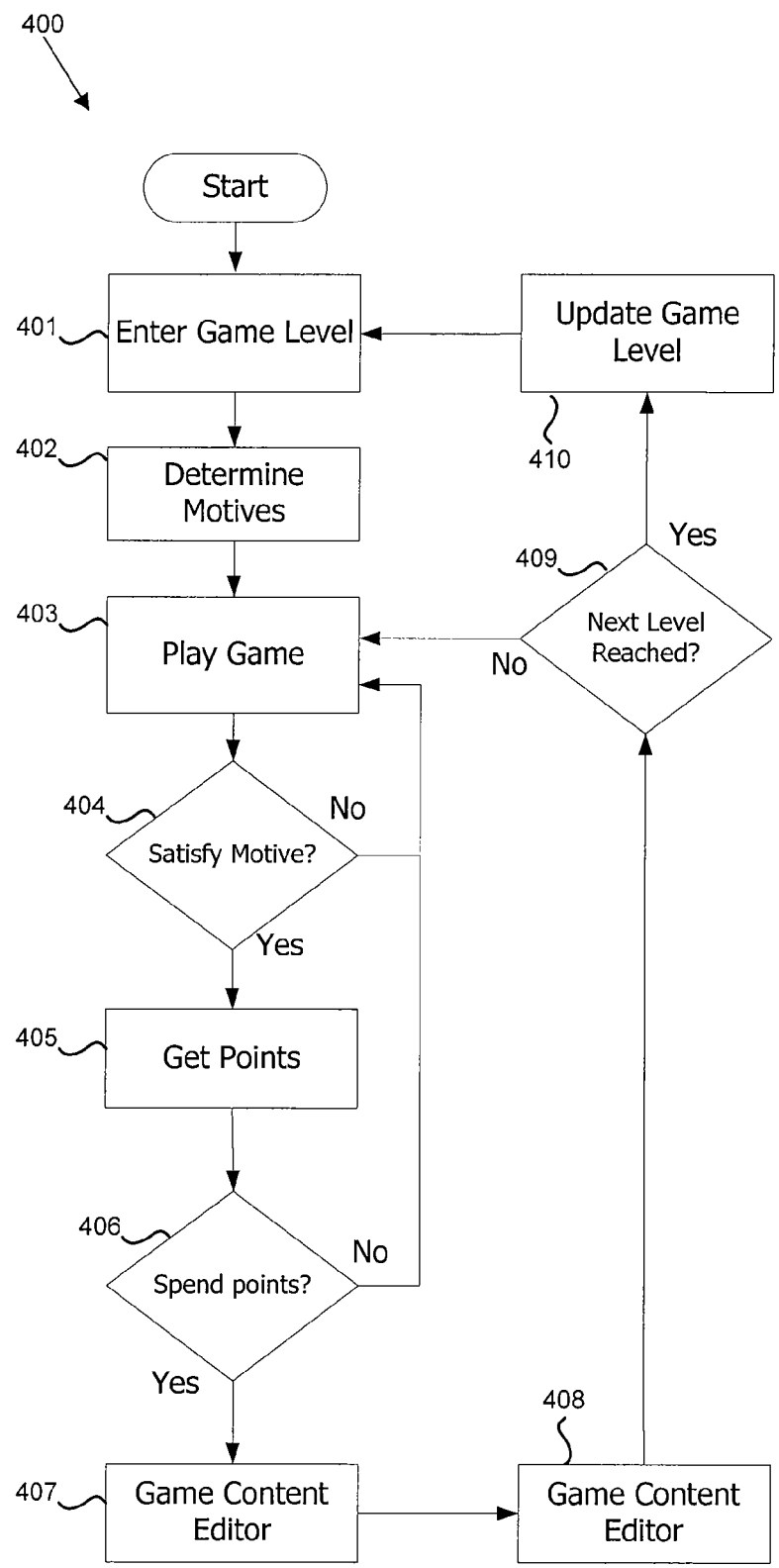
FIG. 4 is a flow diagram of a game loop process in accordance with an embodiment of the present invention.

FIG. 4 is a flow diagram of a game loop process in accordance with an embodiment of the present invention. First, the player enters a game level, step 401, where the game level represents one of the plurality of bands of evolution in the game. In step 402, the game determines the motives that are associated with the game level. The motives associated with a particular game level provide the driving force for a character's actions. For example, the motives in cell game 201 are to eat, to grow, to multiply, and to stay healthy (e.g., not get eaten by predators).

The player plays the game, step 403. At step 404, the game determines if one or more motives of the game level have been satisfied. If one or more motives have been satisfied, the player gains points for each motive satisfied in step 405. Motives might be associated with particular goals that must be completed in order for the motive to be satisfied. For example, in an embodiment, a motive may be to for the creature to grow to a specified size, and in order for the creature to grow, the creature must eat a specified amount of food. Accordingly, if the creature manages to eat the specified amount of food, the motive to grow to the specified size is satisfied. If no motives have been satisfied, the game play continues with step 403.

After a player gains points in step 405, the player has the option to spend the points to purchase additional game content from content shopping module 305. If the player chooses not to spend the points at step 406, then game play resumes at step 403. Otherwise, the process proceeds to step 407.

At step 407, the player may spend his or her earned points by invoking content shopping content module 307 in order to purchase game content. The game content that the player may purchase depends upon which level of the game that the player is currently playing. For example, if the player is currently playing creature game 202, the player may choose to add more legs to his or her creature in order to see if that will provide the player with a performance advantage in the game. Once the player has finished editing game content in step 407, the player's changes to the game data are saved in step 408.

After the game data has been saved in step 408, a determination is made whether enough criteria have been satisfied for reaching the next level of the game. If the criteria for reaching the next level have not been reached, game pl resumes with step 403. However, if the criteria for reaching the next level of the game have been satisfied, the next level of the game will be entered at step 401 and the player will have access to the next level of the game. For example, if the player has satisfied all of the criteria for cell game 201, the game will proceed to creature game 202 in step 401. In some embodiments, the player is given the option of evolving or can chose to remain at a level for an additional time, perhaps to build up more advantages useful at the next level.

Figure 5A:
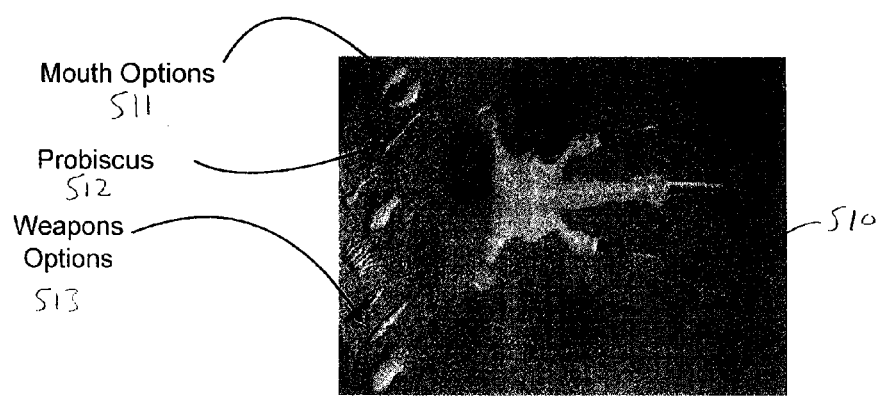
FIG. 5A is a diagram illustrating an example of a content editor user interface.

FIG. 5A is a diagram illustrating an example of a content editor user interface (UI). Content UI 510 is provided by content editing module 301 for cell game 201. On the left side of the content editor UI are the editing options that are currently available. For example, in the cell game, the player can add a mouth to a microorganism using mouth options 511. The player can add a proboscis to the organism using the proboscis options 512. The player can also improve the organism's ability to defend itself by adding or changing the weapons options 513. For example, the player can add sharp claws as shown in the picture on the right-hand side of the organism, so that the organism can attack other creatures rather than have to flee to protect itself.

Figure 5B:
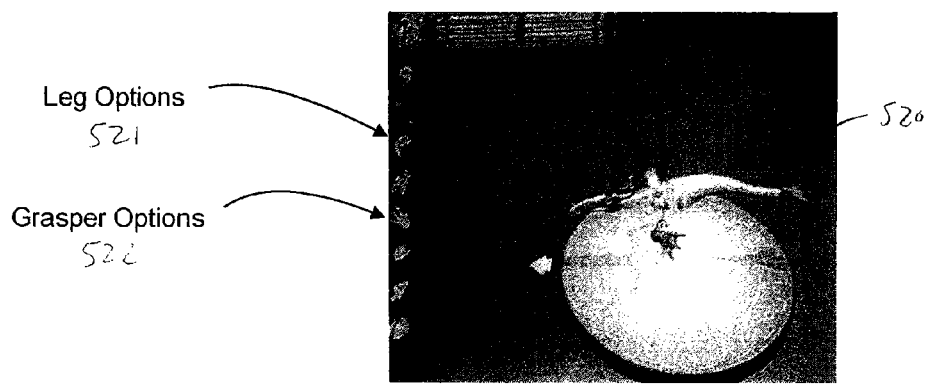
FIG. 5B is a diagram illustrating another example of a content editor user interface.

FIG. 5B is a diagram illustrating another example of a content editor user interface. Content UI 520 is provided by content editing module 301 for creature game 202. On the left side of content editor UI 520 are editing options that are currently available to the player. For example, in creature game 202, the player can add, subtract and/or change the legs on his or her creature by selecting leg options 521. The player can also edit his or her creature to include a grasper by selecting a grasper from grasper options 522. Although not shown in FIG. 5, in some embodiments, when the feature options are selected, a menu showing a list of available options for that particular feature is displayed and the player may select from the list of available options using the menu.

Figure 5C:
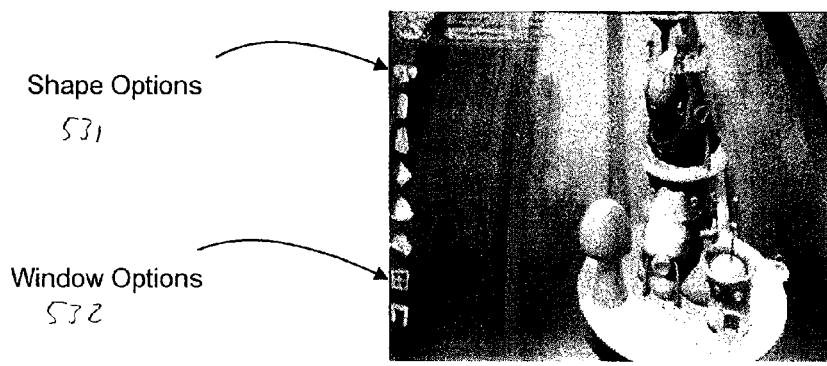
FIG. 5C is a diagram illustrating yet another example of a content editor user interface.

FIG. 5C is a diagram illustrating yet another example of a content editor user interface. Content editor UI 530 is provided by content editing module 301 for city game 204. On the left side of content editor UI 530 are the editing options that are currently available. For example, the player can use shape options 531 to add, remove and/or edit shapes of buildings in the editor. A plurality of publisher-defined seed content might be provided to facilitate the creation of player-edited content rather than requiring players to design new buildings from scratch. Similarly, seed content can be provided for any other game content that players are allowed to edit, in order to facilitate the creation of the content in the game. Otherwise, when a player first starts playing the game, there may not be any predefined player-defined or publisher-defined content available for a particular level of the game. The player may use the seed content as is or may choose to modify the seed content using a content editor provided by the game.

Figure 6A:
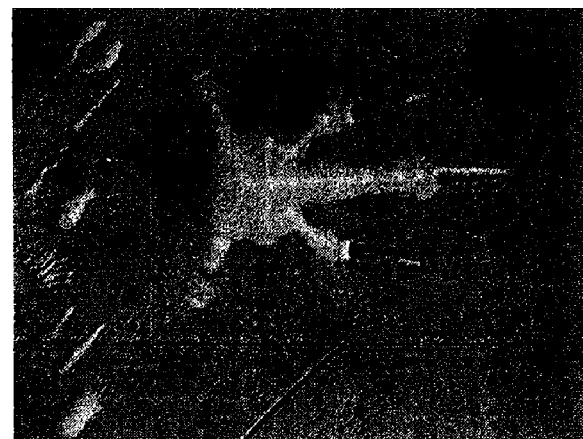
FIG. 6A is a diagram illustrating an example of game content as shown in the content editor user interface and as shown in the context of game play in the cell game.
Figure 6B:
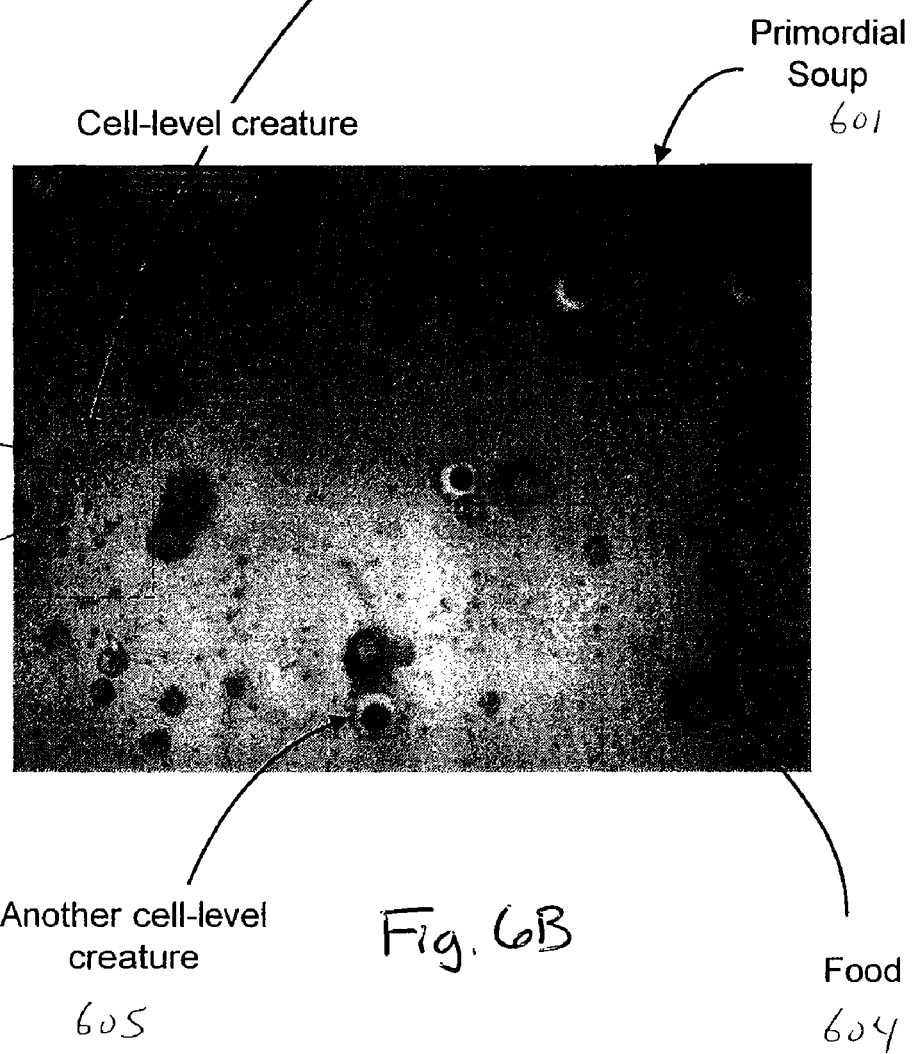
FIG. 6B is a diagram illustrating an example of game content as shown in the context of game play in the cell game.

FIGS. 6A and 6B are diagrams illustrating an example of game content as shown in content editor 510 (FIG. 6A) in the context of game play in cell game 201 (FIG. 6B). Cell game 201 is two-dimensional and is set in the "primordial soup" 601 comprising a game play area in which the player starts out as a single-celled organism and grows the organism by eating and avoiding being eaten by other cell-level creatures living in the environment. In the present embodiment, the player's cell-level organism 602 is shown by the dotted-line rectangle 603.

Game play of cell game 201 is similar in some respects to the game play of the Pac-Man game, in which the player eats food 604 and tries to avoid being eaten by other organisms 605. Weapons, such as claws, may be added to the player's cell-level organism in order to attack and destroy other cell-level creatures 605 if the other cell-level creatures 605 come too close to the player's cell-level organism 602. The player earns points in this level by ingesting and/or destroying other organisms to survive. Once the players' points have reached a predetermined threshold, the player is able to reach the next level of the game, creature game 202.

FIGS. 7A, 7B, 7C, and 7D illustrate the interaction between the content editor UI 520 (creature editor) and creature game 202. FIG. 7C is a diagram illustrating examples of game content as shown in content editor UI 520 (creature editor) and as shown in the context of game play in creature game 202 as shown in FIG. 7A. Creature game 202 is set in three dimensions, unlike cell game 201 of the preceding level of the game. FIG. 7A shows a three-legged creature 701 roaming the landscape of creature game 202. In creature editor 520 (FIG. 7C), creature 701 is shown in a previous form as having fins instead of legs. Creature 701 shown in FIG. 7A depicts an edited form of the creature, where the fins have been removed and three legs were added using leg options 521 (see FIG. 5B which provides a illustration of creature editor 520). The creatures in creature game 202 are generated from procedural content that controls the behavior and appearance of the creature.

The use of procedural content can significantly reduce the disk space requirements necessary for storing game content by storing only the instructions (or the "recipe") for recreating the content rather than storing the content itself. For example, the size can be reduced to approximately 2-5 Kbytes of data. Typically, game content is much larger in size. Creature animation is also recreated from procedural data, so there is no need for the player to develop the animation separately. Procedural animation takes advantage of the structure of the creature and its features (for example, its three legs) and calculates appropriate animations based on those features. Therefore, players can alter the appearance and behavior of a creature by merely selecting alternate body parts for the creature in creature editor 520 and the procedural content associated with the alternate body parts will control at least in part the behavior and animation of the edited creature without the player having to determine the animation for the creature.

A player might be allowed to use content editor 520 to improve the player's creature's ability to hunt. For example, creature 701 includes a tail that enables the creature to hunt and kill prey, which can be ingested as food 702. Procedural animation is applied the animate the creature's basic movement including procedural animation associated with the tail selected for the creature. The procedural animation associated with the tail controls the action of the tail when the creature is hunting. To get the creature to use its tail, the player merely needs to move the creature close enough to the prey that the player wants the creature to kill, and the procedural animation for the tail will take over and strike the prey. Of course, in some variations, more player control might be provided.

Creature game 202 may include a mating feature (FIG. 7D) that allows the player to mate the player's creature with another player-defined or publisher-defined creature in order to further the evolutionary process. The creature might include a mating call feature where the creature may issue a mating call (as shown by mating call indicator 703). If the creature issues a mating call and another creature of the opposite sex is in the area, the player's creature may get a response from the other creature and the player's creature may mate 704 with the other creature. Mating results in the laying of an egg. The egg provides an interface icon for entry into the content editor that enables the player to edit his or her creature to further the evolutionary process.

Figure 8:
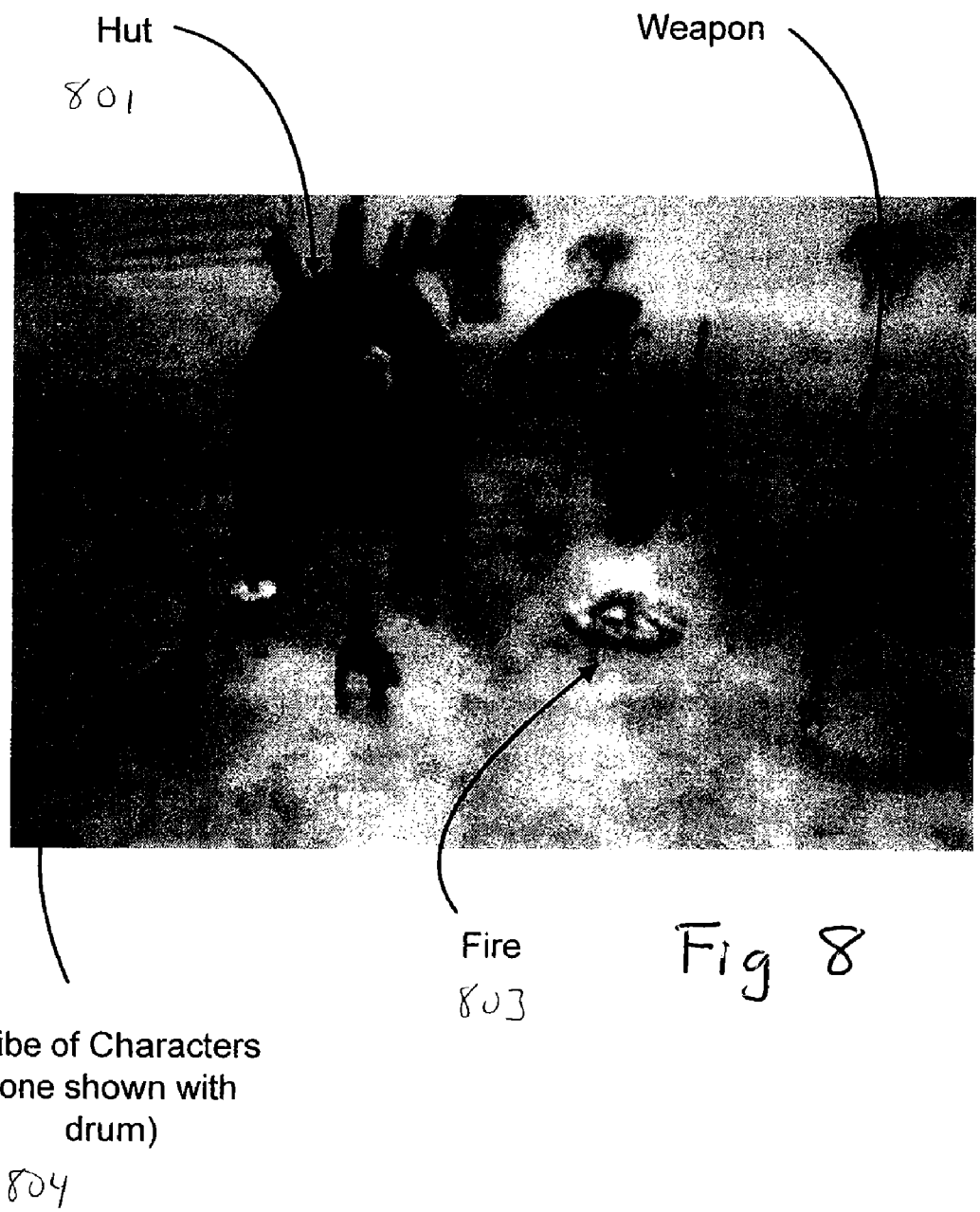
FIG. 8 is a diagram illustrating an example of game content as shown in the context of game play in the tribal game.

FIG. 8 is a diagram illustrating an example of game content as shown in the context of game play in tribal game 203. In the tribal game, the focus of the game play experience changes. In the previous levels of the game, the focus was on individual creatures. Here the focus shifts to a group of creatures. One aspect of tribal game 203 is keeping the players' creatures as a group happy. Tribal game 203 includes a shopping mechanism that a player can use to purchase items for his or her creatures in exchange for points that the player has earned. The player purchases items that will keep his or her creatures happy. For example, the player may purchase shelter, weapons to be used in combat, entertainment items, tools and/or other items for the creatures. In the embodiment depicted in FIG. 8, the player has provided the creatures with hut 801. The creatures have been provided with spear 802 and fire 803 as well as drum 804 for entertainment.

As with the other levels of the game, tribal game 203 can also be populated with player-defined content, so the player's tribe can interact with tribes that have been created by other players. Statistics on how well each tribe performs in combat can be stored on game server 140 in order to provide rankings for the players. Also, huts provided to the creatures are editable content, so the player can design and upload new huts to game server 140 for other players to download into their own games.

Figure 9A:
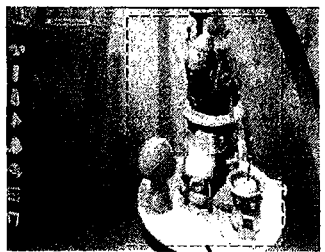
FIG. 9A is a diagram illustrating examples of game content as shown in the content editor user interface and as shown in the context of game play in the city game.
Figure 9B:
FIG. 9B is a diagram illustrating examples of game content as shown in the content editor user interface and as shown in the context of game play in the city game.
Figure 9C:
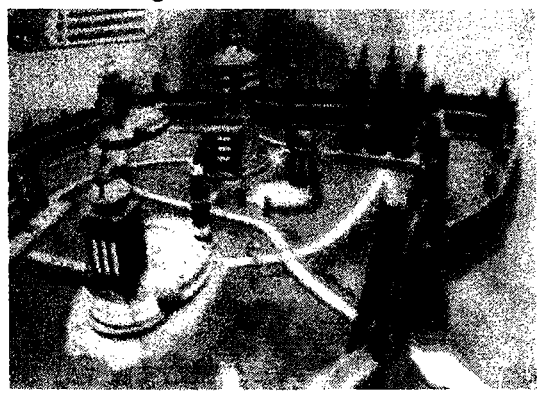
FIG. 9C is a diagram illustrating examples of game content as shown in the content editor user interface and as shown in the context of game play in the city game.

FIGS. 9A, 9B, and 9C illustrate the interaction between the content editor UI 530 (building editor) and city game 203. A player can edit a building in the city game using the building editor UI 901. The player can then place the edited building into city 902. As with the other levels of the evolution game, the player may create and/or download player-defined content into city game 204. The player may edit the style of the buildings and the aesthetics of city 902. For example, the city 902 depicted in FIG. 9B has a "Dr. Seuss"-style look and feel, while the city 903 depicted in FIG. 9C has different style characteristics and different aesthetic.

Content matching module 307 can include code for processes to select content to be downloaded to a particular player's game client. For example, content matching module 307 may include code embodying rules for filtering out content based on criteria, such as matches to the style and/or the aesthetics of player-defined content. In order to retain an interesting game play experience, the matching processes should be imperfect enough to allow for the introduction of the occasional surprising piece of game content so that the player continues to be entertained. However, in some embodiments, matching could be made stricter to impose tighter controls on the kind of content that is downloaded to a particular game client.

Figure 10:
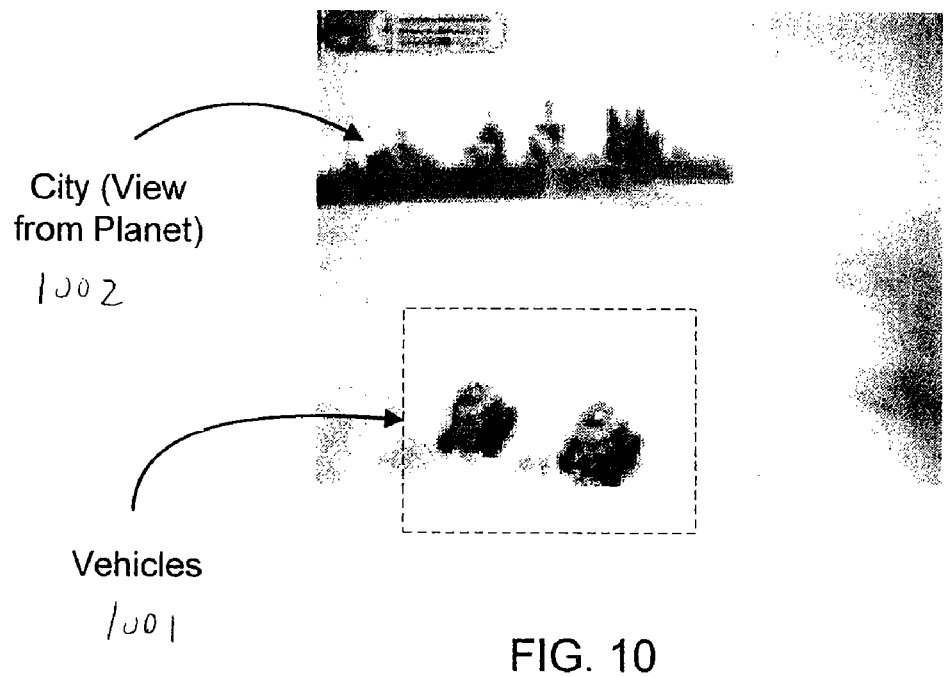
FIG. 10 is a diagram illustrating an example of game content as shown in the context of game play in the civilization game.

FIG. 10 is a diagram illustrating an example of game content as shown in the context of game play in civilization game 205. Civilization game 205 is an evolution of city game 204. At the civilization game level, the player has accumulated the appropriate number of game points and/or amount of game experience to be able to purchase vehicles 1001 through content shopping module 305. The player may use these vehicles to travel to or from other player-defined or publisher-designed cities to try to establish contact with those cities. Alternatively, the player may choose to simply wage war on other cities such as city 1002. Game server 140 saves the player's win/loss statistics. If the player is playing the game in standalone mode, the win/loss information may be stored on the player's game client and then uploaded when the player establishes a network connection to the game server. However, if the player never chooses to connect to the server, the player may continue to play the game in standalone mode. As described above, having a network connection to game server 140 is not necessary to play the evolution game, but a network connection to game server 140 is necessary in order to be able to download content from other players who have uploaded their content to the server. Of course, such connection can be through any of a variety of methods, such as wired or wireless networking.

Figure 11:
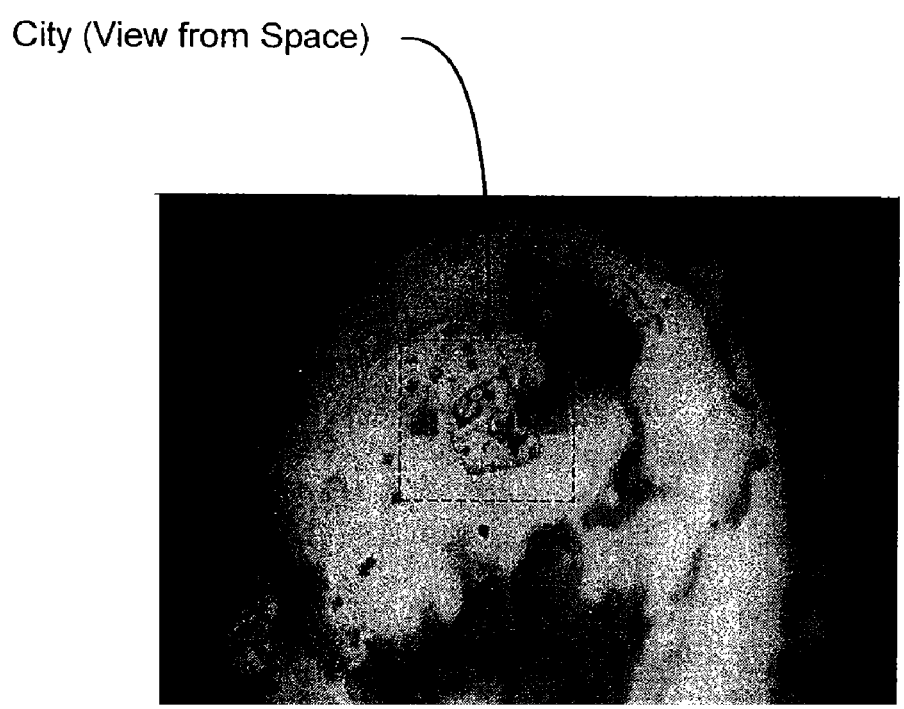
FIG. 11 is a diagram illustrating an example of game content as shown in the context of game play in the planet game.

FIG. 11 is a diagram illustrating an example of game content as shown in the context of game play in planet game 206. As the player continues to work his or her way up the levels in the simulated evolution game, he or she will eventually be able to purchase a UFO ("Unidentified Flying Object"). The player can then use the UFO to travel into space and observe the planet from space. For example, the player can view the city of FIG. 10 from space.

Figure 12:
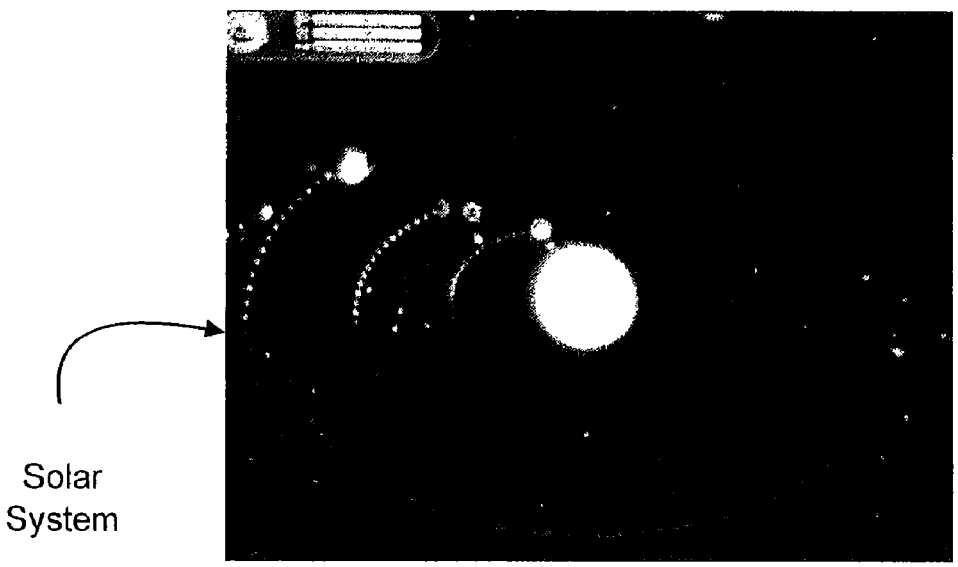
FIG. 12 is a diagram illustrating an example of game content as shown in the context of game play in the space game.
Figure 13:
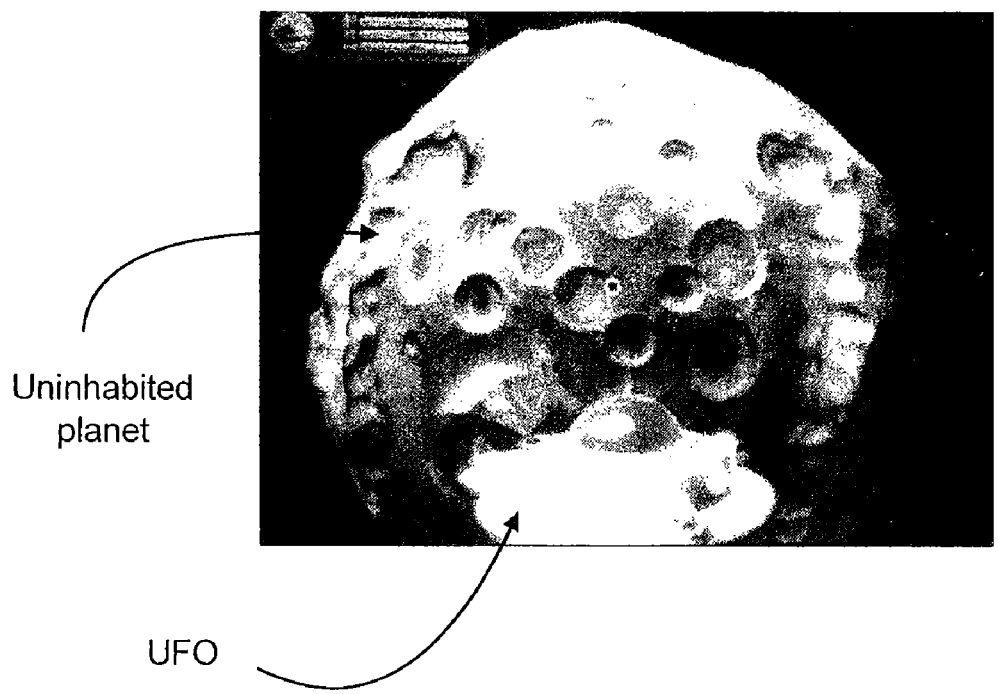
FIG. 13 is a diagram illustrating another example of game content as shown in the context of game play in the space game.

FIG. 12-13 are diagrams illustrating an example of game content as shown in the context of game play in space game 207. FIG. 12 shows a solar system that the player can travel to with the UFO. Each of the planets in the solar system can include player-defined content. Alternatively, players can start with seed content that has been provided by the game publisher and customize the content through their content editor. For example, FIG. 13 shows an uninhabited planet in an embodiment of space game 207. The player can approach the uninhabited planet with his or her UFO and use various game play tools included in space game 207 to make changes to the planet. For example, in an embodiment, the player can use a terraforming tool provided in space game 207 to alter the planet, such as by creating volcanoes or adding an atmosphere. Embodiments of the present invention may also include more powerful tools that expedite the terraforming of the planet, such as a "Genesis device" that alters the planet to create a habitable environment for creatures to live in, including an atmosphere. A number of missions might be provided in the space game in which the player can participate. For example, missions might include building relationships with other civilizations and/or collecting flora and fauna from various planets. The player might also be able to create and/or download player-defined content from game server 140 in space game 207.

Figure 14:
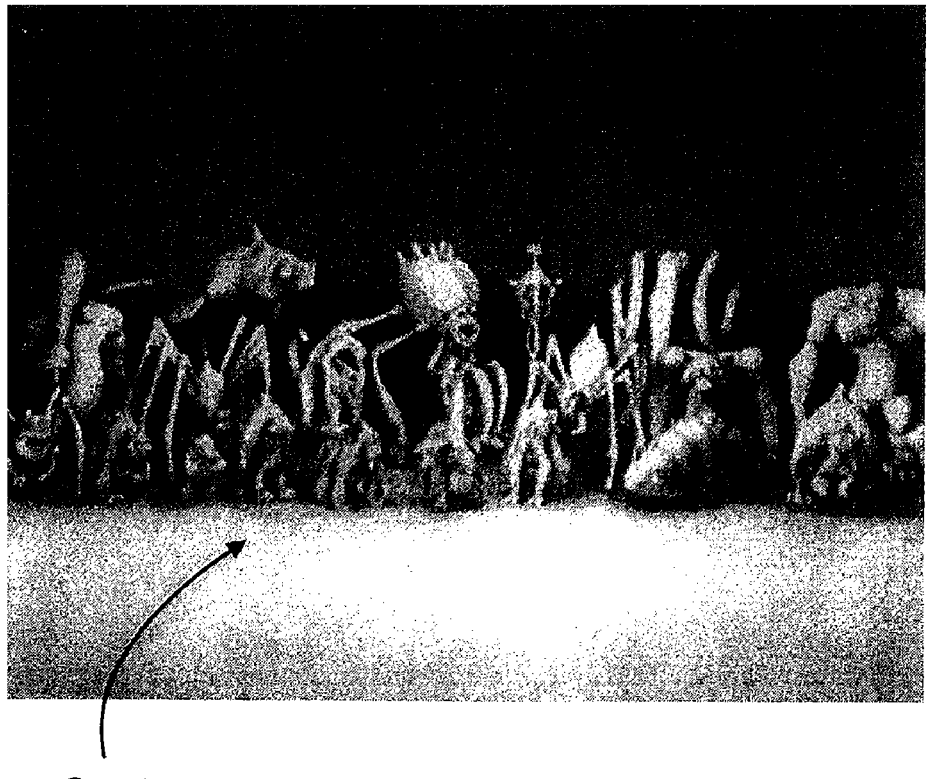
FIG. 14 is a diagram illustrating examples of creatures that may be created with the content editor user interface.

FIG. 14 is a diagram illustrating examples of creatures that may be created with the content editor user interface in accordance with an embodiment of the present invention. In an embodiment of the present invention, content information can be downloaded to an output device that will make a three-dimensional model of player-defined content. These models can be part of a monetization model where the game player can purchase models of all his or her player-defined content by way of an e-commerce process.

Figure 15:
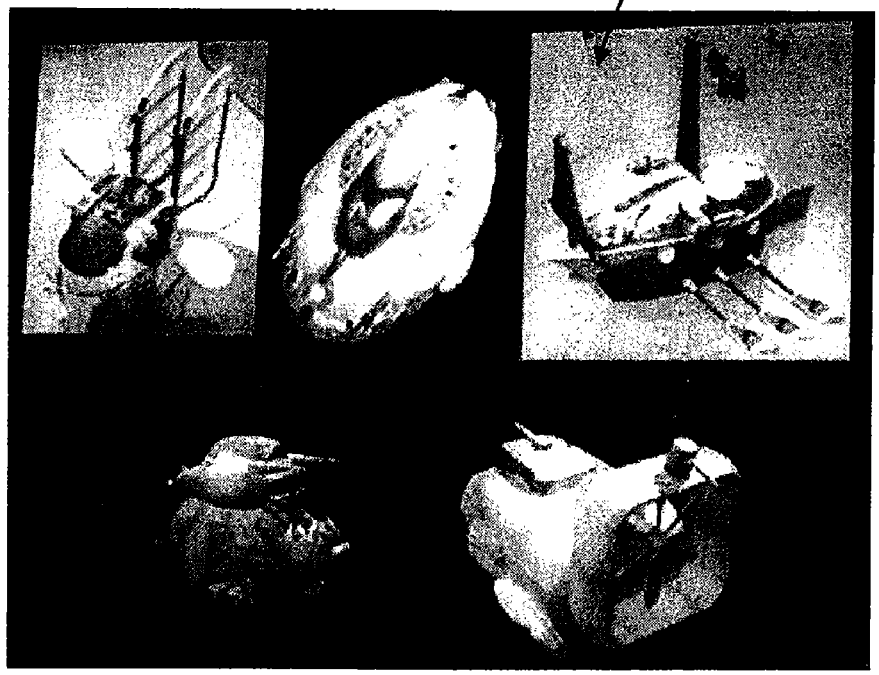
FIG. 15 is a diagram illustrating examples of vehicles that may be created with the content editor user interface.

FIG. 15 is a diagram illustrating examples of vehicles that may be created with the content editor user interface in accordance with an embodiment of the present invention. As described above, three-dimensional models may also be made of player-defined content such as vehicles designed using the content editor and the player may purchase models of his or her player-defined content by way of an e-commerce process.

Figure 16:
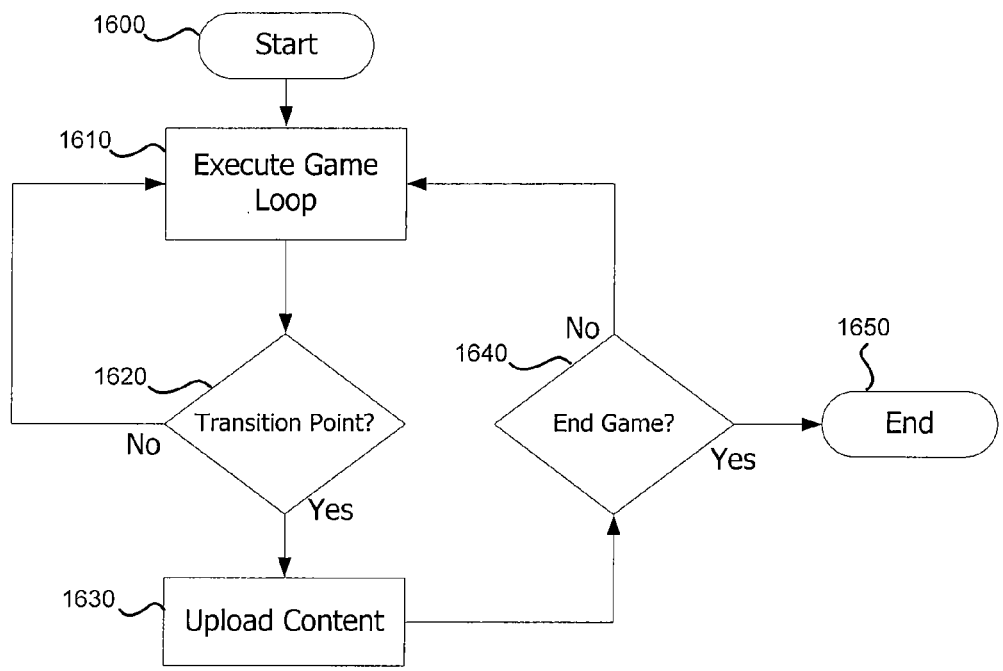
FIG. 16 is a flow diagram of a process for uploading game content.

FIG. 16 is a flow diagram of a process for uploading game content. The process begins with step 1600, and proceeds to step 1610 where the game loop is executed. At step 1620, a determination is made whether a transition point from one level to another has been reached in the game. As described above, a transition point from one game level to another game level may occur when the player has satisfied more than a threshold number of motives for the current level of the game. If a transition point has not been reached, processing continues at step 1610 with the execution the game loop.

Otherwise, if a transition point has been reached, where a player may progress from the current game level to the next game level, the process proceeds to step 1630. At step 1630, the player is provided with the opportunity to upload player-defined content and performance statistics to game server 140 before proceeding to step 1640. At step 1640, a determination is made whether the end of the game has been reached. For example, if the player has satisfied more than a threshold number of motives for the current game level, and the current game is level is not the last game level, the processing continues at step 1610 where the next game level is initialized and the game loop is executed for the next level. For example, if the current level is cell game 201 and the player has satisfied more than the threshold number of motives for cell game 201, then creature game 202 would be initialized at step 1610 and the game loop executed for creature game 202. However, if at step 1640, the last level of the game has been reached (space game 207), then the processing ends at step 1650. In an alternative embodiment, the player can choose between moving to the next level and staying at the current level to achieve more, and that additional achievement can convert to advantages when ultimately moving to the next level. In such variations, there might be a point in the game flow where the player does not get to choose to stay, but is moved to the next level.

Figure 17:
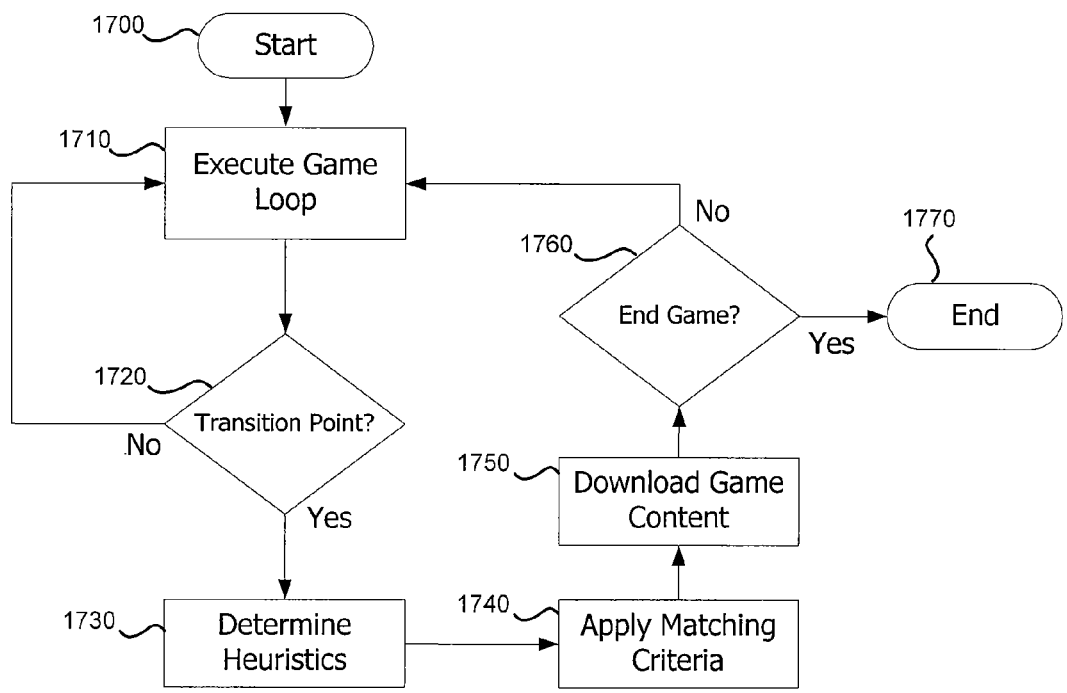
FIG. 17 is a flow diagram of a process for downloading game content.

FIG. 17 is a flow diagram of a process for downloading game content. The process begins with step 1700 and proceeds to step 1710 where the game loop is executed. At step 1720, a determination is made whether a transition point from one level to another has been reached in the game. As described above, a transition point occurs where a player has satisfied more than a threshold number of motives for the current game level. If a transition point has not been reached, or the player opts to stay, processing continues at step 1710 with the execution the game loop.

Otherwise, if a transition point has been reached where a player may progress from the current game level to the next game level, the process proceeds to step 1730. At step 1730, a transition point has been reached. Before proceeding to the next level of the game, content for the next level of the game is downloaded from game server 140 in some embodiments. For example, player-defined content defining creatures and/or game objects might be downloaded to the player's game client before the game proceeds to the next level. In step 1730, the game code determines a heuristic method to be applied when determine what, if any, player-defined and/or publisher-defined game content is to be downloaded to the player's game client. More details regarding the heuristics methods for determining which content to download are provided below in the description of content matching module 307.

After determining the matching criteria to apply in step 1730, the matching criteria are applied to the player-defined and/or publisher-defined content stored in game content database 130 in step 1740. In step 1750, game server 140 downloads to the player's game client the player-defined and/or publisher-defined game content from game content database 130 that satisfies the matching criteria. The downloaded player-defined and/or publisher-defined data can then be used in playing the next level of the game. Processing continues with step 1760, where a determination is made whether the end of the game has been reached. If the end of the game has been reached, then processing ends at step 1770. Otherwise, the execution continues with the next level of the game at step 1710. In alternative embodiments of the present invention, step 1760 is performed after step 1720, and steps 1730, 1740 and 1750 are only performed if the player has not reached the end of the game.

Figure 18:
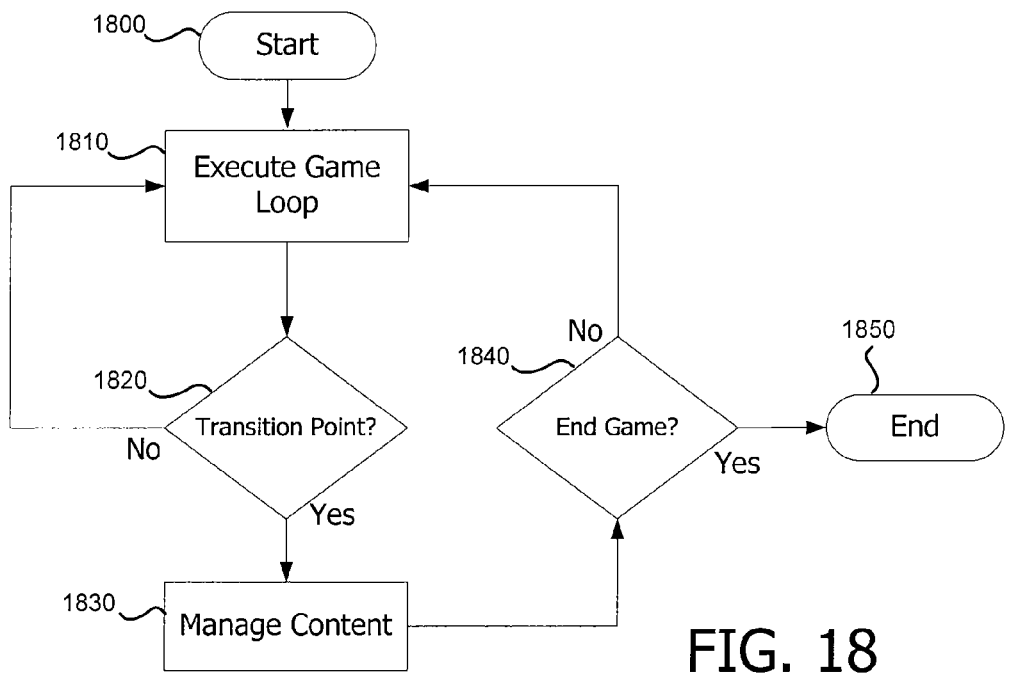
FIG. 18 is a flow diagram of a process for managing game content.

FIG. 18 is a flow diagram of a process for managing game content in accordance with an embodiment of the present invention. The process begins with step 1800 and proceeds to step 1810 where the game loop is executed. At step 1820, a determination is made whether a transition point from one level to another has been reached in the game. As described above, a transition point occurs where a player has satisfied more than a threshold number of motives for the current game level. If a transition point has not been reached, processing continues at step 1810 with the execution the game loop.

Otherwise, if a transition point has been reached where a player may progress from the current game level to the next game level, the process proceeds to step 1830, unless the player can and does choose otherwise. At step 1830, a transition point has been reached. Before proceeding to the next level of the game, the player is provided with an opportunity to manage game content on the game client. For example, in an embodiment, the player may upload player-defined content from the game client to game server 140. Furthermore, the player may download player-defined and publisher-defined content from game server 140. At step 1840, a determination is made whether to end the game or to continue executing the game loop. If the player has completed the last level of the game and/or the player has chosen to exit the game after managing the content in step 1830, the process ends with step 1850. Otherwise, the process returns to step 1810 where the game loop is executed.

Figure 19:
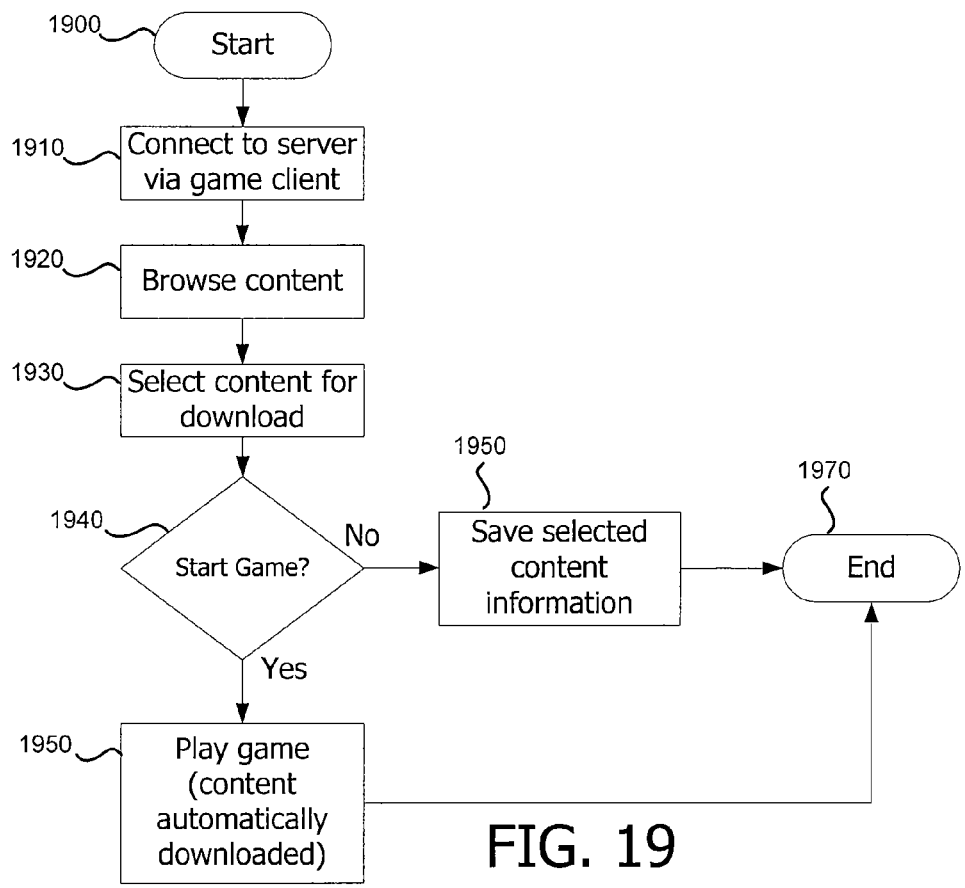
FIG. 19 is a flow diagram of a process for browsing game content.

FIG. 19 is a flow diagram of a process for browsing game content. The process begins with step 1900, and proceeds to step 1910 where the player's game client connects to game server 140. The network connection is established by the game client in response to instructions from the evolution video game program running on the game client. The player is then able to use in-game browser 306 to browse player-defined and publisher-defined game content stored in game content database 130 in step 1920. The in-game browser allows a player to browse and download game content from the evolution video game without having to exit the game. At step 1930, the player selects content for download from game server 140. At step 1940, a determination is made whether the player wishes to start playing the evolution video game or whether the player would like to save the selected content information for later download. If the player chooses to start playing the video game, the process continues at step 1950. At step 1950, the selected game content is downloaded automatically while the player plays the game. In an embodiment, the selected game content is downloaded as a background process and the player is able to start playing the game while the selected content downloads.

Returning to step 1940, if the player chooses not to start the game, then the process continues with step 1960. At step 1960, the game server 140 stores a list of game content that the player selected for download while browsing the game content on in game content database 130. The selected game content will be downloaded to the player's game client the next time that the player connects to game server 140.

Figure 20:
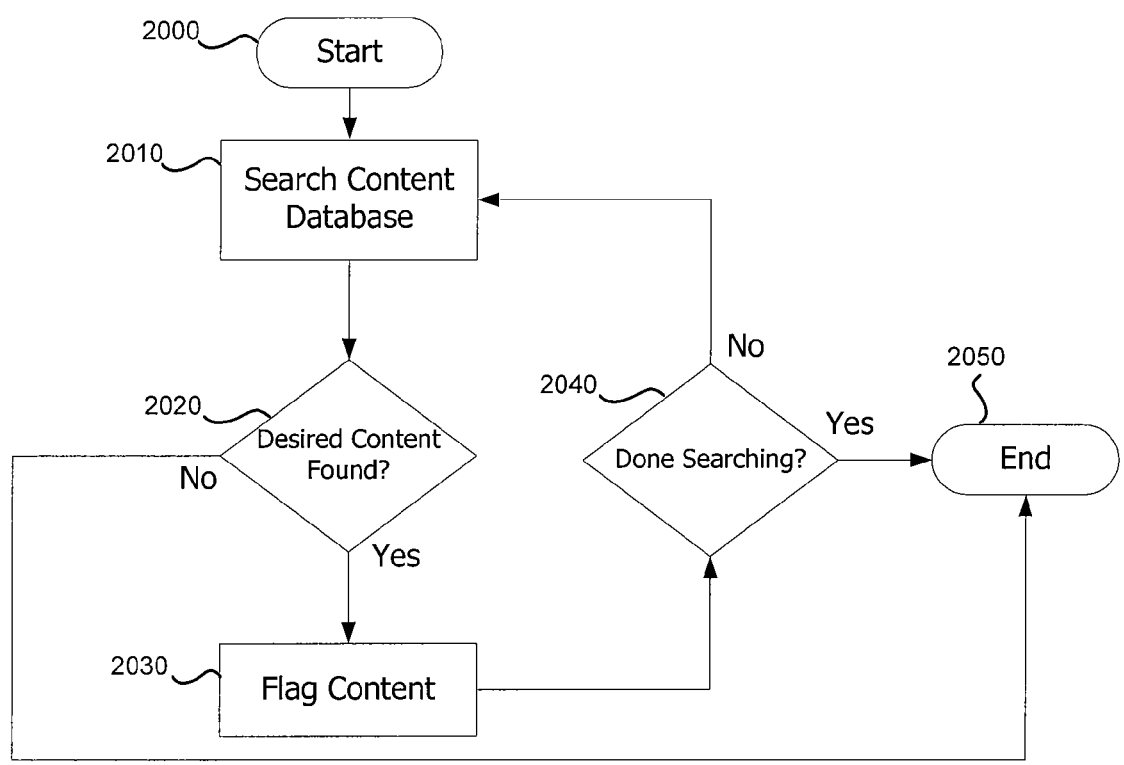
FIG. 20 is a flow diagram of a process for searching game content.

FIG. 20 is a flow diagram of a process for searching game content. Searches may be conducted from a network connected game client, such as a video game console, a personal computer, or a mobile phone. The process starts with step 2000 and proceeds to step 2010 where the game client contacts game server 140 and submits a set of search criteria to game server 140 to use to construct a query for searching for game content in game content database 130. In step 2020, a determination is made whether content matching the search criteria was found. If content matching the search criteria was found, the process continues with step 2030, where the content is flagged for download by game server 140 to the player's game client.

In some embodiments, instead of flagging the content for later download, the content matching the search criteria is automatically downloaded to the player's game client and the player can review the downloaded content with in-game browser 306. The process continues with step 2040, where a determination is made whether the player is done searching for game content. If the player is done searching for game content, then the process terminates at step 2050. Otherwise, the process returns to step 2010.

Returning to step 2020, if no content matching the search criteria was found, the process terminates at step 2050.

Figure 21:
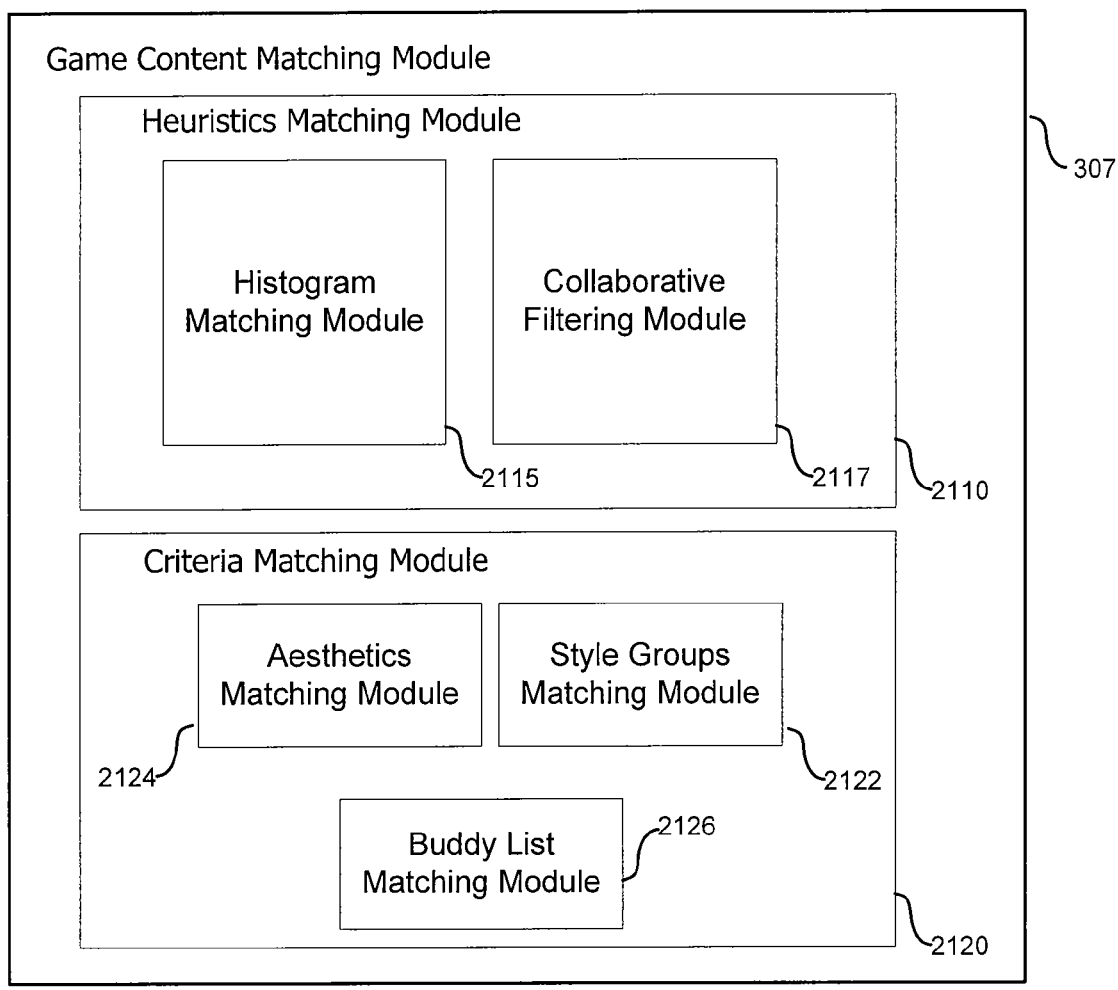
FIG. 21 is a block diagram illustrating a game content matching module for use in the video game module shown in FIG. 3.

FIG. 21 is a block diagram illustrating additional details of game content matching module 307 for use in video game module 300 shown in FIG. 3. In an embodiment, game content matching module 307 includes a heuristics matching module 2110. Heuristics matching module 2110 may include a histogram matching module 2115 and a collaborative filtering module 2117.

Heuristics algorithms might be used where determining a precise solution to a problem might take an unreasonable amount of time. However, in a game environment, the algorithms need to be able to determine a solution to a problem reasonably quickly or performance of the game could be negatively impacted. Accordingly, a heuristic algorithm might be designed to run within a reasonably amount of time to determine a reasonably good solution to a problem. Thus, a potentially less precise result is exchanged for the algorithm determining a solution within a reasonable amount of time.

Histogram matching module 2115 applies a histogram matching approach where an algorithm tabulates a set of frequencies for certain attributes or groups of attributes associated with a current game state of a player's game. Those attributes or groups of attributes having the highest "score" or frequency are used in matching player-created and/or publisher-created content located in game content database 130 that has attributes or groups of attributes with frequencies similar to those determined for the player's current game state. In an embodiment, histogram matching data (i.e. scores) are determined by histogram matching module 2115 on a player's game client and the game submits a request to game server 140 to have game server 140 query game content database 130 to find data with corresponding "scores" for various attributes. In alternative embodiments, histogram data is determined on the client and sent to the game server which applies a matching algorithm to identify content to be downloaded to the video game client.

Collaborative filtering module 2117 applies a collaborative filtering method for making automated predictions about the interests of a player determined from preference information collected from a number of players. Collaborative filtering is based on the premise that those who tended to agree in the past will tend to agree in the future. Collaborative filtering might be applied to determine data for download from game content database 130 based upon the preferences of all or a specified subset of players.

In some embodiments, a heuristics method might be applied when selecting content for download to a player's game client to provide a "pollinated" content experience for the player by dynamically downloading content that is appropriate for the player's game. For example, in an embodiment, the heuristics might match content that is appropriate for the ecosystem that has evolved in the player's local copy of the game. As a result, information about the player's game play is uploaded to game server 140 and game server 140 uses that information to determine what player-defined and/or publisher-defined game content in the content database might be appropriate for the player's ecosystem. For example, if the player's creatures tend to be spiky and warlike, the server will download similar creatures into the game, rather than populate the world with lots of soft, furry characters that will be easy to fight, thus reducing the entertainment value of the player's game experience.

Game server 140 might determine which content is appropriate from game content database 130 based upon the heuristics algorithms included in heuristics matching module 2110, and then download the content to the player's game client. In an embodiment, the heuristics may be modified over time to accommodate various design goals and/or to provide better matching based upon player preferences, as player preferences may change over time.

Game content matching module 307 may also include a criteria matching module 2120 in some embodiments. Criteria matching module 2120 includes an aesthetics matching module 2124, a style groups matching module 2122 and/or a buddy list matching module 2126. Game content matching module 307 uses player preferences to determine content to download from game content database 130. The player preferences can be set to override the heuristic functions provided by heuristics matching module 2110.

The matching criteria used by game content matching module 307 may be either player selected or community selected. For example, in an embodiment, the game community may move to select aesthetics criteria that the community members feel are important and enhance the game playing experience. The community selected aesthetics criteria may then be used by aesthetics matching module 2124 to select player-defined and/or publisher-defined content from game content database 130 that matches the aesthetic criteria. In an embodiment, the player may determine the aesthetic criteria for his or her evolving ecosystem by selecting aesthetics criteria that will be used by aesthetics matching module 2124 for selecting content from game content database 130. The aesthetic criteria might, for example, include aesthetic considerations such as a building style to be used in constructing buildings in city game 204. For example, one player or group of players may prefer to include buildings with a more "futuristic" style of architecture while another player or group of players may prefer to include buildings with an ancient Roman architecture.

In some embodiments, the player may create a set of other players (a "buddy list") with whom the player would like to share game content. Buddy list matching module 2126 may then be used to select and download content created by the set of other players that the player has added to his or her buddy list.

In yet other embodiments, the player may create "style groups" by defining preferred content lists that indicate the type of content that the player would like to download. The style groups matching module 2122 may be used to select content from game content database 139 based upon the preferred content lists created by the player.

The various types of criteria matching included in criteria matching module 2120 may be used either alone or in combination with one another. For example, the player may indicate that he or she only wishes to download content that meets the aesthetic criteria that he or she defined and was created by players on his or her buddy list.

In order to retain a sense of surprise and to keep the game play interesting, the content matching criteria applied by heuristics matching module 2110 and by criteria matching module 2120 should be imperfect enough that an occasional surprising piece of game content is selected and downloaded into the player's game. However, in some variations, tighter controls may be imposed on the matching methods used by game content matching module 307 to limit the types of content that may be downloaded for a particular player.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A client application comprising program code stored on a computer-readable medium that, when executed, performs the steps of:
   accessing a game server via a network;
   automatically downloading instructions for recreating player-defined content from the game server to a video game client, wherein the player-defined content from the game server is selected based upon the characteristics of the player-defined content on the game server and player-defined content stored on the game client, wherein the instructions comprise a set of specifications of the player-defined content, including specifications of animated characters and procedural animation data to control behavior and appearance of the animated characters, wherein selecting player-defined content for automatic downloading includes determining a heuristic method to filter content for the video game client based on a current state of the video game client;
   creating at least one instance of the player-defined content based on the instructions downloaded from the game server; and
   integrating the player-defined content with player-defined content on the video game client.

2. The client application of claim 1 wherein player-defined content is categorized into a set of categories, each category being defined by one or more configurable attributes, and wherein selecting player-defined content for automatically downloading further comprises:
   categorizing player-defined content on the video game client;
   selecting a player-defined content from the game server having similar categories as the player-defined content, wherein selecting player-defined content having similar categories further comprises selecting content having a set of randomized attributes for each category that differ at least in part from the attributes of the player-defined content on the video game client.

3. The client application of claim 1 wherein selecting player-defined content for automatic downloading includes applying a collaborative filtering technique for selecting player-defined content.

4. The client application of claim 3 wherein applying the collaborative filtering technique includes:
- collecting player preference information from a player;
- collecting player preference information from a plurality of other players;
- selecting content for download from at least a subset of the other players that have a similar set of preferences as the player.

5. The client application of claim 1 wherein selecting player-defined content for automatic downloading includes applying a heuristic matching technique for selecting player-defined content.

6. The client application of claim 5 wherein applying the heuristic matching technique includes:
- tabulating a set of frequencies for a set of attributes associated with player-defined content on the video game client; and
- selecting a set of player-defined content on the game server having a set of attributes complementary to the attributes of the player-defined content on the video game client.

7. The client application of claim 5 wherein player-defined content selected for automatic downloading further comprises applying a criteria matching technique for selecting player-defined content.

8. The client application of claim 7 wherein applying the criteria matching technique includes:
- overriding the selections made by the heuristics matching technique if one or more selection criteria are defined for use in selecting content to download to the video game client.

9. The client application of claim 8 further comprising:
- receiving at the video game client the one or more selection criteria to be used in selecting content to download.

10. The client application of claim 9 wherein the one or more selection criteria are used to block content from being downloaded to the video game client.

11. The client application of claim 7 wherein the criteria matching technique comprises a style-matching technique, wherein player-defined content is selected based on a set of player-defined preferred content lists that identify attributes of content that the player would like receive from other players.

12. The client application of claim 1 wherein player-defined content selected for automatic downloading includes applying an aesthetics matching technique, wherein the aesthetics matching technique selects content for download that has visual attributes complimentary to player-defined content on the video game client.

13. The client application of claim 1 wherein player-defined content selected for automatic download is selected from a list of other players from which player-defined content may be downloaded.

14. The client application of claim 1 wherein the client application further performs the steps of:
- automatically uploading instructions for recreating player-defined content to the game server from the video game client.

15. The client application of claim 14 wherein the one or more selection criteria are used to block player-defined content on the video game client from being uploaded to the game server.

16. The client application of claim 1 wherein the player-defined content includes player-defined animated characters, wherein the appearance and behavior of the animated characters is defined by predefined procedural animation data and creating the player-defined content includes selecting procedural animation data to control the behavior and appearance of player-defined animated characters.

17. The client application of claim 16 wherein a player-defined animated character comprises a plurality of body parts, and the appearance and behavior of each body party is controlled by procedural animation data associated with the body part.

18. The client application of claim 16 wherein the player-defined content includes player-defined animated objects that interact with the player-defined animated characters, wherein the appearance and behavior of the animated objects is defined by predefined procedural animation data and creating the player-defined content includes selecting procedural animation data to control the behavior and appearance of player-defined animated objects.

19. A computer-implemented method for sharing content in a video game environment:
- accessing a game server via a network;
- automatically downloading instructions for recreating player-defined content from the game server to a video game client, wherein the player-defined content from the game server is selected based upon the characteristics of the player-defined content on the game server and player-defined content stored on the game client, wherein the instructions comprise a set of specifications of the player-defined content, including specifications of animated characters and procedural animation data to control behavior and appearance of the animated characters, wherein selecting player-defined content for automatic downloading includes determining a heuristic method to filter content for the video game client based on a current state of the video game client;
- creating at least one instance of the player-defined content based on the instructions downloaded from the game server; and
- integrating the player-defined content with player-defined content on the video game client.

20. A video game system comprising:
- a game server coupled to a network, wherein the game server is configured to communicate with a plurality of game clients over the network;
- wherein the game server is configured to automatically download instructions for recreating player-defined content from the game server to a video game client, wherein the player-defined content from the game server is selected based upon the characteristics of the player-defined content on the game server and player-defined content stored on the game client, wherein the instructions comprise a set of specifications of the player-defined content, including specifications of animated characters and procedural animation data to control behavior and appearance of the animated characters, wherein selecting player-defined content for automatic downloading includes determining a heuristic method to filter content for the video game client based on a current state of the video game client;
- wherein the plurality of video game clients is configured to create at least one instance of the player-defined content based on the instructions downloaded from the game server; and
- wherein the plurality of video game clients is configured to integrate the player-defined content with player-defined content on the video game client.

* * * * *